United States Patent
Misumi (10) Patent No.: US 12,350,745 B2
(45) Date of Patent: Jul. 8, 2025

(54) CUTTING TOOL

(71) Applicant: Sumitomo Electric Hardmetal Corp., Itami (JP)

(72) Inventor: Shuhei Misumi, Itami (JP)

(73) Assignee: SUMITOMO ELECTRIC HARDMETAL CORP., Itami - shi (JP)

( * ) Notice: Subject to any disclaimer, the term of this patent is extended or adjusted under 35 U.S.C. 154(b) by 0 days.

(21) Appl. No.: 18/272,099

(22) PCT Filed: Feb. 1, 2023

(86) PCT No.: PCT/JP2023/003266
§ 371 (c)(1),
(2) Date: Jul. 13, 2023

(87) PCT Pub. No.: WO2024/161564
PCT Pub. Date: Aug. 8, 2024

(65) Prior Publication Data
US 2024/0253136 A1  Aug. 1, 2024

(51) Int. Cl.
*B23C 5/10* (2006.01)
*B23C 5/00* (2006.01)
*B23C 5/16* (2006.01)

(52) U.S. Cl.
CPC ............... *B23C 5/10* (2013.01); *B23C 5/006* (2013.01); *B23C 2210/0485* (2013.01);
(Continued)

(58) Field of Classification Search
CPC ... B23C 5/10; B23C 5/006; B23C 2210/0485; B23C 5/003; B23C 2210/088; B23C 2210/086; B23C 2210/486
See application file for complete search history.

(56) References Cited

U.S. PATENT DOCUMENTS 3,548,476 A   12/1970   Cave et al.
4,285,618 A   8/1981   Shanley, Jr.
(Continued)

FOREIGN PATENT DOCUMENTS

CN   105228780 A   1/2016
CN   112157303 A   1/2021
(Continued)

OTHER PUBLICATIONS

Decision to Grant mailed on May 16, 2023, received for JP Application 2023-523263, 5 pages including English Translation.

*Primary Examiner* — Sara Addisu
(74) *Attorney, Agent, or Firm* — XSENSUS LLP (57) ABSTRACT

A cutting tool according to one aspect of the present disclosure includes a shaft portion and cutting edge portions. The main cutting edge portions have a main cutting edge. In a section within ±30% of a blade length of a region from a center of the region in a direction along the central axis, the main cutting edge portions have first and second nick portions. The main cutting edge portions are formed in the region. The relationship between the first nick portion and the second nick portion satisfies at least one of a first condition and a second condition. The first condition is that a width of the first nick portion is different from a width of the second nick portion. The second condition is that a depth of the first nick portion is different from a depth of the second nick portion.

20 Claims, 5 Drawing Sheets

(52) U.S. Cl.
CPC .. *B23C 2210/086* (2013.01); *B23C 2210/088* (2013.01); *B23C 2210/486* (2013.01)

(56) References Cited

U.S. PATENT DOCUMENTS

| | | | | |
|---|---|---|---|---|
| 5,759,185 | A * | 6/1998 | Grinberg | B23C 5/28 606/180 |
| 6,164,876 | A * | 12/2000 | Cordovano | B23C 5/10 407/59 |
| 6,234,725 | B1 * | 5/2001 | Campian | B23Q 11/0046 408/67 |
| 7,399,147 | B1 * | 7/2008 | VanDyke, Jr. | B23C 5/003 407/53 |
| 7,544,021 | B2 * | 6/2009 | Flynn | B23C 5/003 407/54 |
| 10,118,236 | B2 * | 11/2018 | Archambault | B23C 5/10 |
| 11,213,901 | B2 * | 1/2022 | Kuroda | B23C 5/10 |
| 2006/0216125 | A1 * | 9/2006 | Glimpel | B23G 5/188 408/222 |
| 2010/0215447 | A1 * | 8/2010 | Davis | B23C 5/10 407/115 |
| 2010/0226726 | A1 * | 9/2010 | Strasmann | B23C 5/003 407/54 |
| 2012/0009543 | A1 * | 1/2012 | Meier | A61C 3/02 433/165 |
| 2012/0020749 | A1 * | 1/2012 | Maeda | B23C 5/003 407/42 |
| 2012/0195701 | A1 * | 8/2012 | Pan | B23C 5/10 407/54 |
| 2014/0161546 | A1 * | 6/2014 | Shpigelman | B23C 5/10 407/54 |
| 2014/0356083 | A1 * | 12/2014 | Budda | B23C 5/10 407/54 |
| 2015/0078841 | A1 * | 3/2015 | Haimer | B23C 5/003 407/54 |
| 2015/0258616 | A1 * | 9/2015 | Stanbach | B23C 5/10 407/54 |
| 2019/0283150 | A1 * | 9/2019 | Stojanovski | B23C 5/1009 |
| 2019/0299304 | A1 * | 10/2019 | Jia | B23C 5/165 |
| 2019/0344364 | A1 * | 11/2019 | Pittala | B23C 5/28 |
| 2020/0290134 | A1 * | 9/2020 | Waki | B23C 5/10 |
| 2022/0072628 | A1 * | 3/2022 | Bonfiglio | B23B 47/34 |
| 2023/0390836 | A1 * | 12/2023 | Saitoh | B23C 5/10 |
| 2023/0415248 | A1 * | 12/2023 | Ukei | B23C 5/10 |

FOREIGN PATENT DOCUMENTS

| | | | | |
|---|---|---|---|---|
| DE | 202018000764 U1 * | 4/2018 | | B23C 5/10 |
| EP | 913222 A1 * | 5/1999 | | B23C 5/10 |
| EP | 3695928 A1 | 8/2020 | | |
| EP | 3858525 A1 * | 8/2021 | | A24F 19/06 |
| JP | 06335813 A * | 6/1994 | | |
| JP | 10034422 A * | 2/1998 | | B23C 5/10 |
| JP | 10263915 A * | 10/1998 | | B23C 5/10 |
| JP | 2011-000696 A | 1/2011 | | |
| JP | 2011-020248 A | 2/2011 | | |
| JP | 2011-020257 A | 2/2011 | | |
| JP | 2011-083891 A | 4/2011 | | |
| JP | 2014148041 A * | 8/2014 | | B23C 5/10 |
| JP | 2021-120171 A | 8/2021 | | |
| WO | WO-2016098092 A1 * | 6/2016 | | B23C 5/10 |

* cited by examiner

CUTTING TOOL

CROSS-REFERENCE TO RELATED APPLICATION

The present application is based on PCT filing PCT/JP2023/003266, filed Feb. 1, 2023, the entire contents of which are incorporated herein by reference.

TECHNICAL FIELD

The present disclosure relates to a cutting tool.

BACKGROUND ART

Conventionally, a cutting tool has been known that includes a rotatable main body, a main cutting edge having a helix angle on an outer periphery of the main body, and nick cutting edges arranged at a reverse helix angle with respect to the helix angle of the main cutting edge (see, for example, Japanese Patent Laying-Open No. 2011-20248).

CITATION LIST

Patent Literature

PTL 1: Japanese Patent Laying-Open No. 2011-20248

SUMMARY OF INVENTION

A cutting tool according to one aspect of the present disclosure includes a shaft portion and at least two main cutting edge portions. The shaft portion extends along a central axis. The shaft portion has an outer peripheral surface. The outer peripheral surface surrounds the central axis. The at least two main cutting edge portions are helically disposed on the outer peripheral surface. The main cutting edge portions have a main cutting edge. The main cutting edge has a helix angle. In a section within ±30% of a blade length of a region from a center of the region in a direction along the central axis, the main cutting edge portions have at least one first nick portion and at least one second nick portion. The main cutting edge portions are formed in the region. The first nick portion and the second nick portion have helix angles in an opposite direction with respect to the helix angle. The relationship between the first nick portion and the second nick portion satisfies at least one of a first condition and a second condition. The first condition is that a width of the first nick portion is different from a width of the second nick portion. The second condition is that a depth of the first nick portion is different from a depth of the second nick portion.

DETAILED DESCRIPTION

Problem to be Solved by the Present Disclosure

In the conventional cutting tool, the number of flutes of the nicked cutting edge is set to be different from the number of main cutting edges, by which a workpiece having a satisfactory cut surface can be obtained with the vibration of the workpiece being suppressed. However, there is a limit to suppression of vibration of the workpiece.

The present disclosure has been made to solve the above problems. More specifically, the present invention provides a cutting tool capable of suppressing vibration of a workpiece during cutting work.

Advantageous Effect of the Present Disclosure

According to the cutting tool of the present disclosure, vibration of a workpiece during cutting can be suppressed.

Description of Embodiments

First, embodiments of the present disclosure will be listed and described.

(1) A cutting tool according to one aspect of the present disclosure includes a shaft portion and at least two main cutting edge portions. The shaft portion extends along a central axis. The shaft portion has an outer peripheral surface. The outer peripheral surface surrounds the central axis. The at least two main cutting edge portions are helically disposed on the outer peripheral surface. The main cutting edge portions have a main cutting edge. The main cutting edge has a helix angle. In a section within ±30% of a blade length of a region from a center of the region in a direction along the central axis, the main cutting edge portions have at least one first nick portion and at least one second nick portion. The main cutting edge portions are formed in the region. The first nick portion and the second nick portion have helix angles in an opposite direction with respect to the helix angle. The relationship between the first nick portion and the second nick portion satisfies at least one of a first condition and a second condition. The first condition is that a width of the first nick portion is different from a width of the second nick portion. The second condition is that a depth of the first nick portion is different from a depth of the second nick portion.

(2) In the cutting tool according to (1), the first condition may be that the width of the first nick portion is greater than or equal to 2 times and less than or equal to 10 times the width of the second nick portion. The second condition may be that the depth of the first nick portion is greater than or equal to 2 times and less than or equal to 15 times the depth of the second nick portion.

(3) In the cutting tool according to (1) or (2), a cross-sectional area of the first nick portion may be greater than or equal to 5 times and less than or equal to 120 times a cross-sectional area of the second nick portion.

(4) In the cutting tool according to any one of (1) to (3), the number of the main cutting edge portions may be larger than the number of the first nick portions included in each of the main cutting edge portions.

(5) In the cutting tool according to any one of (1) to (4), the helix angle of the main cutting edge may be greater than or equal to 30° and less than or equal to 50° The helix angle in the opposite direction with respect to the helix angle in each of the first nick portion and the second nick portion may be greater than or equal to 30° and less than or equal to 50°.

(6) In the cutting tool according to any one of (1) to (5), the main cutting edge portions may include at least two first nick portions. The second nick portion may be disposed at an intermediate position between two first nick portions.

(7) The cutting tool according to any one of (1) to (6) may be coated with diamond.

Detailed Description of Embodiments

Embodiments of the present disclosure will now be described in detail with reference to the drawings. In the following drawings, the same or corresponding parts are denoted by the same reference numerals, and redundant description will not be repeated.

First Embodiment

<Configuration of Cutting Tool 1>

Figure 1:
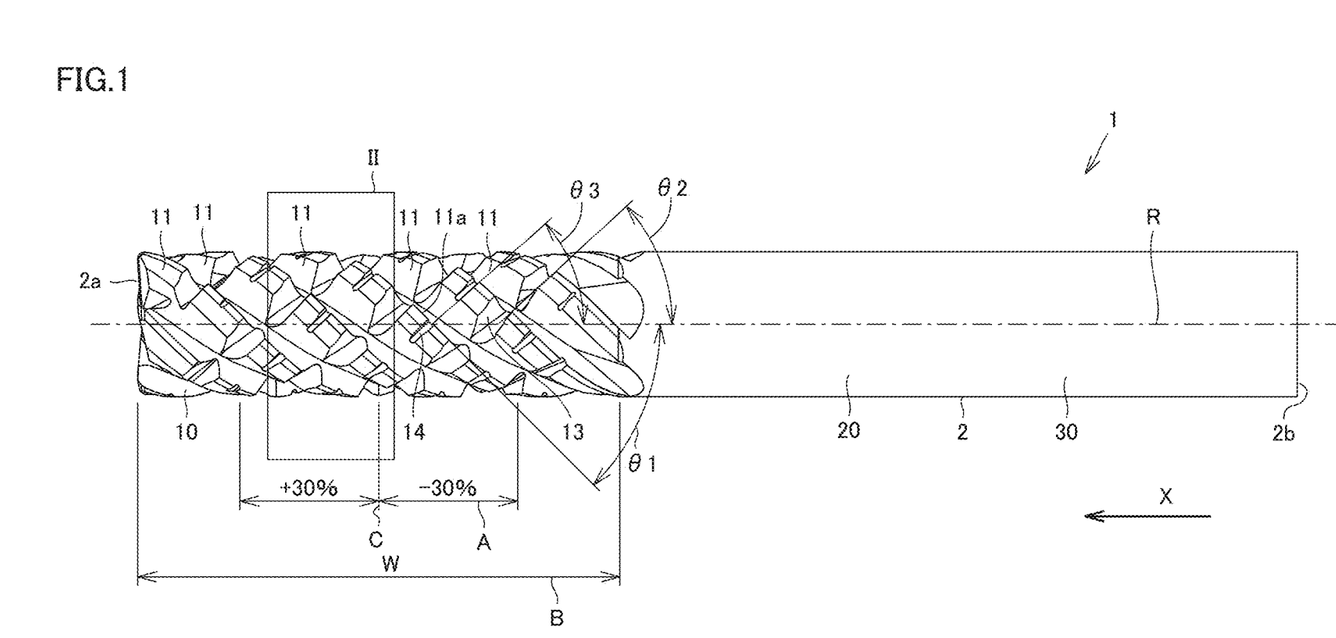
FIG. 1 is a plan view of a cutting tool according to a first embodiment.
Figure 2:
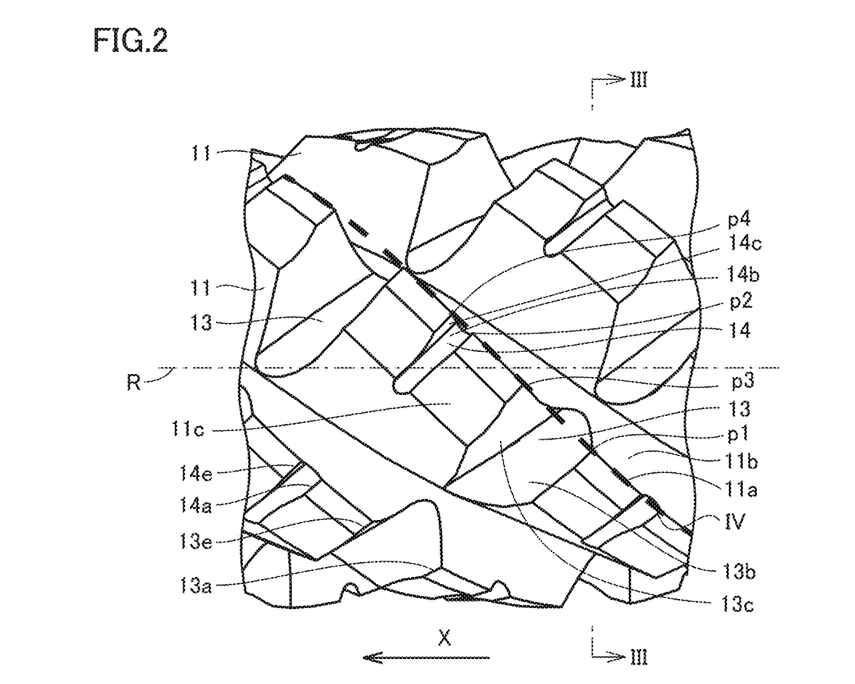
FIG. 2 is a partially enlarged plan view of a region II in FIG. 1.
Figure 3:
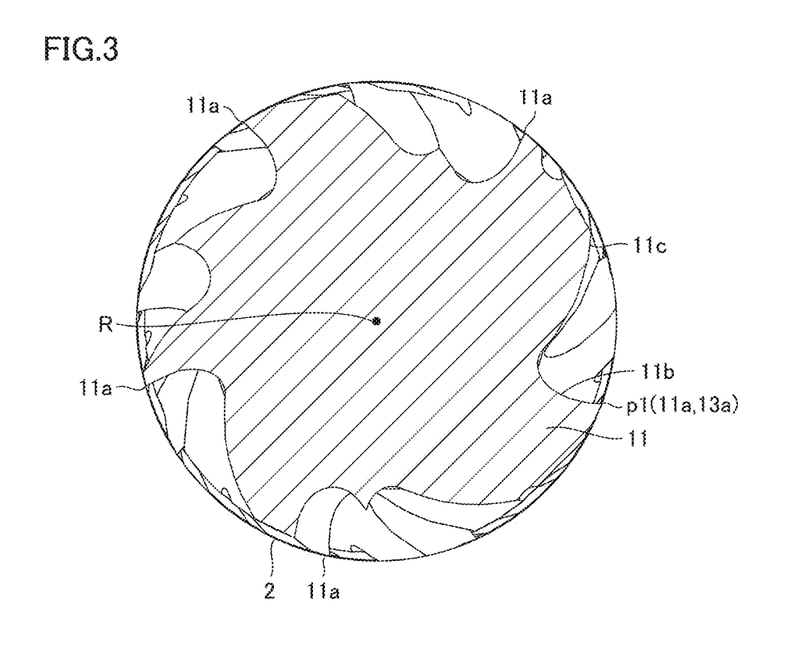
FIG. 3 is a cross-sectional view taken along line III-III in FIG. 2.
Figure 4:
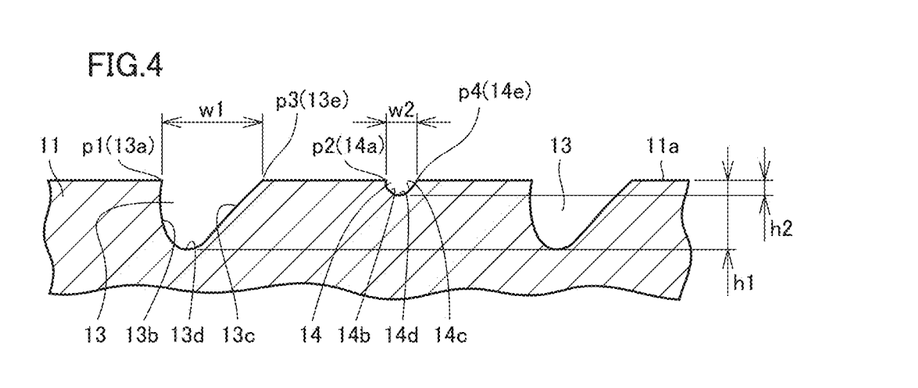
FIG. 4 is a partially enlarged schematic sectional view illustrating a region IV in FIG. 2.

FIG. 1 is a plan view of a cutting tool 1 according to the present embodiment. FIG. 2 is a partially enlarged plan view of a region II in FIG. 1. FIG. 3 is a cross-sectional view taken along line III-III in FIG. 2 FIG. 4 is a partially enlarged schematic sectional view illustrating a region IV in FIG. 2

As illustrated in FIGS. 1 to 4, cutting tool 1 according to an aspect of the present disclosure is a tool for cutting a fiber reinforced plastic (FRP) material such as carbon fiber reinforced plastic, and mainly includes a shaft portion 30 and at least two main cutting edge portions 11. In the present embodiment, the number of main cutting edge portions 11 is five. Shaft portion 30 has substantially a cylindrical shape. Shaft portion 30 extends along a central axis R. Shaft portion 30 has a front end face 2a, a rear end face 2b, and an outer peripheral surface 2. Rear end face 2b is located on the side opposite to the front end face 2a. Outer peripheral surface 2 is a surface connecting front end face 2a and rear end face 2b That is, outer peripheral surface 2 surrounds central axis R. Shaft portion 30 is rotatable about central axis R.

Shaft portion 30 further includes a shank portion 20 and a cutting portion 10. Cutting portion 10 has front end face 2a. Shank portion 20 has rear end face 2b. That is, cutting portion 10 is connected to shank portion 20. In FIG. 1, when a direction in which central axis R extends is defined as a first direction X, a blade length W of cutting portion 10 is a distance from front end face 2a to an end portion of main cutting edge portion 11 on the rear end face 2b side in first direction X. Front end face 2a and rear end face 2b are perpendicular to central axis R. That is, front end face 2a and rear end face 2b are perpendicular to outer peripheral surface 2. A cutting diameter is, for example, 10 mm. The cutting diameter may be, for example, greater than or equal to 2 mm or less than or equal to 20 mm, and it may be 3 mm.

In cutting portion 10, five main cutting edge portions 11 are formed on outer peripheral surface 2. Main cutting edge portions 11 are helically disposed on outer peripheral surface 2. As illustrated in FIG. 3, each of main cutting edge portions 11 has a main rake face 11b, a main flank face 11c, and a main cutting edge 11a. Main cutting edge 11a is disposed on outer peripheral surface 2. Main rake face 11b is formed so as to extend from main cutting edge 11a in a direction toward central axis R from main cutting edge 11a. Main flank face 11c is located on a side opposite to main rake face 11b as viewed from main cutting edge 11a Main rake face 11b is connected to main flank face 11c via main cutting edge 11a.

Main cutting edge 11a has a main helix angle θ1. In plan view viewed from a direction perpendicular to central axis R, main helix angle θ1 is an angle that is a narrower angle out of angles formed by a tangent of main cutting edge 11a and central axis R at a point where central axis R and main cutting edge 11a intersect, as illustrated in FIG. 1.

As illustrated in FIGS. 2 and 4, a first nick portion 13 includes a first nick rake face 13b, a first nick facing face 13c, a first nick cutting edge 13a, and a first nick connection portion 13e. Each of first nick rake face 13b and first nick facing face 13c is connected to main rake face 11b and main flank face 11c. First nick rake face 13b is connected to main flank face 11c via first nick cutting edge 13a. First nick facing face 13c is connected to main flank face 11c via first nick connection portion 13e. Main cutting edge 11a and first nick cutting edge 13a meet at a first intersection point p1. First nick connection portion 13e and main cutting edge 11a meet at a third intersection point p3. That is, first intersection point p1 is located on outer peripheral surface 2 as illustrated in FIG. 3. Third intersection point p3 is located on outer peripheral surface 2.

A region IV illustrated in FIG. 2 is a cross-sectional region of main cutting edge portion 11 obtained by cutting main cutting edge portion 11 in a direction perpendicular to central axis R from a line segment along main cutting edge 11a of main cutting edge portion 11. That is, region IV is a cross-sectional region of main cutting edge portion 11 including first intersection point p1, a second intersection point p2, third intersection point p3, and a fourth intersection point p4. FIG. 4 is a partially enlarged schematic sectional view of a cross-sectional region of main cutting edge portion 11 in region IV. The schematic sectional view illustrated in FIG. 4 schematically illustrates main cutting edge portion 11 including first nick portion 13 and a second nick portion 14 to be described later. Although actual main cutting edge 11a has a curved shape because it is helically arranged, FIG. 4 illustrates main cutting edge 11a as a straight line for the sake of description. A vertical direction in FIG. 4 indicates a radial direction around central axis R of cutting tool 1

As illustrated in FIG. 4, first nick rake face 13b and first nick facing face 13c are formed to extend toward central axis R from main cutting edge 11a. First nick rake face 13b and first nick facing face 13c are connected to each other with a first nick bottom portion 13d. First nick bottom portion 13d is a portion closest to central axis R in first nick portion 13. That is, in first nick portion 13, first nick bottom portion 13d is a point farthest from outer peripheral surface 2 in the direction toward central axis R. A distance from outer peripheral surface 2 to first nick bottom portion 13d is a depth h1. As illustrated in FIG. 4, a width w1 of first nick portion 13 is a length of a line segment connecting first intersection point p1 and third intersection point p3 of first nick portion 13. Note that a cross-sectional area A1 of first nick portion 13 is an area of a region surrounded by a straight line connecting first intersection point p1 and third intersection point p3, first nick rake face 13b, and first nick facing face 13c illustrated in FIG. 4. Width w1 of first nick portion 13 may be, for example, greater than or equal to 0.35 mm and less than or equal to 4.2 mm. Depth h1 of first nick portion 13 may be, for example, greater than or equal to 0.1 mm and less than or equal to 3.4 mm.

First nick cutting edge 13a has a reverse helix angle θ2. In plan view viewed from the direction perpendicular to central axis R, reverse helix angle θ2 is an angle that is a narrower angle out of angles formed by a tangent of first nick cutting edge 13a and central axis R at a point where central axis R and first nick cutting edge 13a intersect, as illustrated in FIG. 1. In plan view, reverse helix angle θ2 of first nick cutting edge 13a is a helix angle in opposite direction with respect to main helix angle θ1 of main cutting edge 11a as viewed from central axis R as illustrated in FIG. 1. As described above, main cutting edge portion 11 includes first nick portion 13. Due to first nick portion 13 described above being provided, generation of vibration is suppressed and cutting resistance is reduced during cutting of a workpiece.

Here, cutting tool 1 according to the first embodiment is characterized in that, as illustrated in FIGS. 1 to 4, main cutting edge portion 11 of cutting tool 1 includes second nick portion 14. Specifically, in each of main cutting edge portions 11, second nick portion 14 is disposed so as to be sandwiched between two first nick portions 13 in first direction X as illustrated in FIG. 1. Second nick portion 14 may be disposed at, for example, an intermediate position between two first nick portions 13. Second nick portion 14 may be disposed at a position other than the intermediate position of two first nick portions 13, as long as the strength of cutting tool 1 can be ensured. For example, a plurality of (for example, two) second nick portions 14 may be provided between two first nick portions 13.

As illustrated in FIG. 4, second nick portion 14 is different in shape from first nick portion 13. Specifically, the relationship between first nick portion 13 and second nick portion 14 satisfies at least one of a first condition and a second condition. The first condition is that width w1 of first nick portion 13 is different from a width w2 of second nick portion 14. The second condition is that depth h1 of first nick portion 13 is different from a depth h2 of second nick portion 14. Providing second nick portion 14 having a shape different from that of first nick portion 13 in main cutting edge portion 11 as described above can significantly suppress vibration generated during cutting. As a result, the finish quality of the machined surface of the workpiece cut by cutting tool 1 is improved.

As illustrated in FIG. 1, second nick portion 14 is disposed within a first region A. First region A is a section within ±30% of blade length W of a region B where main cutting edge portions 11 are formed from a center C of region B in first direction X. Specifically, region B where main cutting edge portions 11 are formed is a region up to a position away from front end face 2a of cutting portion 10 by blade length W in first direction X. Center C is a position away from front end face 2a by a half length of blade length W in first direction X. That is, when the direction in which front end face 2a is located in first direction X based on center C in first direction X is positive, a surface away from center C by +50% of blade length W of cutting portion 10 in first direction X from center C is front end face 2a. From a different point of view, first region A is a region within ±30% of blade length W of cutting portion 10 from center C in first direction X based on center C. That is, second nick portion 14 is located on outer peripheral surface 2 of cutting portion 10 in first region A. Second nick portion 14 may be formed in a region other than first region A within region B where main cutting edge portions 11 are formed. However, the formation of second nick portion 14 may become more difficult at a position closer to front end face 2a and shank portion 20 due to a manufacturing problem.

As illustrated in FIGS. 2 and 4, second nick portion 14 includes a second nick rake face 14b, a second nick facing face 14c, a second nick cutting edge 14a, and a second nick connection portion 14e. Each of second nick rake face 14b and second nick facing face 14c is connected to main rake face 11b and main flank face 11c. Second nick rake face 14b is connected to main flank face 11c via second nick cutting edge 14a. Second nick facing face 14c is connected to main flank face 11c via second nick connection portion 14e. Main cutting edge 11a and second nick cutting edge 14a meet at second intersection point p2. Second nick connection portion 14e and main cutting edge 11a meet at fourth intersection point p4. That is, second intersection point p2 is located on outer peripheral surface 2 as illustrated in FIG. 3. Fourth intersection point p4 is located on outer peripheral surface 2.

As illustrated in FIG. 4, second nick rake face 14b and second nick facing face 14c are formed to extend toward central axis R from main cutting edge 11a. Second nick rake face 14b and second nick facing face 14c are connected to each other with a second nick bottom portion 14d Second nick bottom portion 14d is a portion closest to central axis R in second nick portion 14. That is, in second nick portion 14, second nick bottom portion 14d is a point farthest from outer peripheral surface 2 in the direction toward central axis R. A distance from outer peripheral surface 2 to second nick bottom portion 14d is a depth h2. As illustrated in FIG. 4, width w2 of second nick portion 14 is a length of a line segment connecting second intersection point p2 and fourth intersection point p4 of second nick portion 14. Note that a cross-sectional area A2 of second nick portion 14 is an area of a region surrounded by a straight line connecting second intersection point p2 and fourth intersection point p4, second nick rake face 14b, and second nick facing face 14c illustrated in FIG. 4.

Note that width w1 of first nick portion 13, depth h1 of first nick portion 13, width w2 of second nick portion 14, and depth h2 of second nick portion 14 are measured from the profile shapes of first nick portion 13 and second nick portion 14. The profile shapes of first nick portion 13 and second nick portion 14 may be measured using a non-contact three-dimensional measuring machine manufactured by Bruker Alicona. Cross-sectional area A1 of first nick portion 13 and cross-sectional area A2 of second nick portion 14 can be calculated from the profile shapes of first nick portion 13 and second nick portion 14 described above.

Second nick cutting edge 14a has a reverse helix angle θ3. In plan view viewed from the direction perpendicular to central axis R, reverse helix angle θ3 is an angle that is a narrower angle out of angles formed by a tangent of second nick cutting edge 14a and central axis R at a point where central axis R and second nick cutting edge 14a intersect, as illustrated in FIG. 1. In plan view, reverse helix angle θ3 of second nick cutting edge 14a is a helix angle in opposite direction with respect to main helix angle θ1 of main cutting edge 11a as viewed from central axis R as illustrated in FIG. 1. As described above, main cutting edge portion 11 includes second nick portion 14.

It is only sufficient that, in each of main cutting edge portions 11, the number of first nick portions 13 is, for example, greater than or equal to one. The number of first nick portions 13 may be two or three. In addition, the number of first nick portions 13 included in each of main cutting edge portions 11 is preferably smaller than the number of main cutting edge portions 11 included in cutting tool 1. From a different point of view, the number of main cutting edge portions 11 is preferably larger than the number of first nick portions 13 included in each of main cutting edge portions 11. When the number of main cutting edge portions 11 is different from the number of first nick portions 13 as described above, first nick portions 13 can be easily arranged so as not to overlap each other in the rotation direction of cutting tool 1, and thus, during cutting of the workpiece, it is possible to prevent the occurrence of a region that is not cut on the cut surface of the workpiece when cutting tool 1 makes one rotation.

It is only sufficient that the number of second nick portions 14 included in each of main cutting edge portions 11 is, for example, greater than or equal to one. The number of second nick portions 14 included in each of main cutting edge portions 11 may be two or three. When the number of first nick portions 13 and the number of second nick portions 14 included in each of main cutting edge portions 11 are large, generation of vibration is further suppressed and cutting resistance is further reduced during cutting of the workpiece by cutting tool 1.

However, due to second nick portion 14 being provided, the strength of main cutting edge portion 11 and the tool life may be reduced. In view of this, cutting tool 1 may be coated with diamond. With this configuration, the strength and tool life of cutting tool 1 can be improved.

Operation and Effect

Cutting tool 1 according to the present disclosure includes shaft portion 30 and at least two main cutting edge portions 11. Shaft portion 30 extends along a central axis R. Shaft portion 30 has outer peripheral surface 2. Outer peripheral surface 2 surrounds central axis R. At least two main cutting edge portions 11 are helically disposed on outer peripheral surface 2. Main cutting edge portions 11 have main cutting edge 11a. Main cutting edge 11a has helix angle θ1. In a section within ±30% of blade length W of region B from center C of region B in a direction along central axis R, main cutting edge portions 11 have at least one first nick portion 13 and at least one second nick portion 14. Main cutting edge portions 11 are formed in region B. First nick portion 13 and second nick portion 14 have helix angles θ2 and θ3 in an opposite direction with respect to helix angle θ1. The relationship between first nick portion 13 and second nick portion 14 satisfies at least one of the first condition and the second condition. The first condition is that width w1 of first nick portion 13 is different from width w2 of second nick portion 14. The second condition is that depth h1 of first nick portion 13 is different from depth h2 of second nick portion 14.

With this configuration, vibration generated during cutting can be greatly suppressed. As a result, the finish quality of the machined surface of the workpiece cut by cutting tool 1 is improved.

In cutting tool 1, the first condition may be that width w1 of first nick portion 13 is greater than or equal to 2 times and less than or equal to 10 times width w2 of second nick portion 14. The second condition may be that depth h1 of first nick portion 13 is greater than or equal to two times and less than or equal to 15 times depth h2 of second nick portion 14.

With this configuration, vibration generated during cutting can be greatly suppressed, and sufficient discharge performance of chips generated during cutting can be ensured. As a result, second nick portion 14 is not clogged by chips during cutting, whereby the finish quality of the machined surface of the workpiece is greatly improved.

In cutting tool 1, cross-sectional area A1 of first nick portion 13 is greater than or equal to 5 times and less than or equal to 120 times cross-sectional area A2 of second nick portion 14. With this configuration, vibration generated during cutting can be greatly suppressed, and sufficient discharge performance of chips generated during cutting can be ensured. As a result, second nick portion 14 is not clogged by chips during cutting, whereby the finish quality of the machined surface of the workpiece is greatly improved.

In cutting tool 1, the number of main cutting edge portions 11 may be larger than the number of first nick portions 13 included in each of main cutting edge portions 11. This configuration can prevent an occurrence of an uncut portion of the workpiece during cutting when cutting tool 1 makes one rotation.

In cutting tool 1, helix angle θ1 of main cutting edge 11a may be greater than or equal to 30° and less than or equal to 50°. In each of first nick portion 13 and second nick portion 14, helix angles θ2 and θ3 in the opposite direction with respect to helix angle θ1 may be greater than or equal to 30° and less than or equal to 50°. With this configuration, the generation of vibration is suppressed and the cutting resistance is reduced during cutting, and the finish quality of the machined surface is improved, as described later.

In cutting tool 1, main cutting edge portion 11 may include at least two first nick portions 13. Second nick portion 14 may be disposed at an intermediate position between two first nick portions 13. With this configuration, it is possible to minimize a decrease in strength of main cutting edge portion 11 due to the formation of second nick portion 14.

Cutting tool 1 may be coated with diamond. With this configuration, the strength and tool life of cutting tool 1 can be improved.

In order to verify the effects of cutting tool 1 according to the first embodiment as described above, the following test was performed.

(Test 1)

<Object for Test>

Test 1 was carried out to evaluate the finish of the cut surface of a workpiece, the chip discharge performance, and the tool life of cutting tool 1 due to the presence or absence of second nick portion 14. Three kinds of cutting tools 1 from Sample 1 to Sample 3 were used as objects for the test. The cutting diameter of cutting tool 1 according to each of Samples 1 to 3 is 10 mm, and the number of main cutting edge portions 11 is five. The number of first nick portions 13 in one main cutting edge portion 11 is six. In each of Samples 1 and 2, the main cutting edge portion 11 has first nick portion 13, but does not have second nick portion 14. On the other hand, in Sample 3, main cutting edge portion 11 includes first nick portion 13 and second nick portion 14. The number of second nick portions 14 in first region A in one main cutting edge portion 11 in Sample 3 is six. Width w1 of first nick portion 13 of cutting tool 1 according to Sample 2 is smaller than widths w1 of first nick portions 13 of cutting tools 1 according to Sample 1 and Sample 3. First nick portion 13 in each of Sample 1 and Sample 3 has width w1 of 2.0 mm and depth h1 of 1.5 mm. First nick portion 13 in Sample 2 has width w1 of 1.0 mm, and depth h1 of 0.6 mm. Second nick portion 14 in Sample 3 has width w2 of 0.5 mm and depth h2 of 0.3 mm. In this way, the influence of width w1 of first nick portion 13 and the influence of the presence or absence of second nick portion 14 were examined.

<Test Conditions>

The workpiece is CFRP. The thickness of the CFRP is 6 mm. As cutting conditions, the rotation speed of cutting tool 1 was set to 4000 rpm, and the machining speed was set to 400 mm/min.

<Result>

TABLE 1

|  | Condition | | Result | | |
| --- | --- | --- | --- | --- | --- |
|  | Width of first nick portion | Whether or not second nick portion is provided | Finish of cut surface | Chip discharge performance | Tool life |
| Sample 1 | Large | Not provided | C | B | A |
| Sample 2 | Small | Not provided | B | C | C |
| Sample 3 | Large | Provided | A | A | A |

The results of the test are shown in Table 1. Table 1 shows, from the left, width w1 of first nick portion 13 and whether or not second nick portion 14 is provided as the conditions, and the finish of the cut surface of the workpiece, the chip discharge performance, and the tool life of cutting tool 1 as the test results. Note that A, B, and C indicate the evaluation in each of the finish of the cut surface, the chip discharge performance, and the tool life of cutting tool 1 in Table 1. B indicates that the result is better than the result indicated as C. A indicates that the result is better than the result indicated as B. That is, A indicates that the evaluation result is the best of the results indicated by A, B, and C. In particular, the result indicating that the chip discharge performance is good indicates that clogging due to chips can be suppressed.

As can be seen from the test results of cutting tools 1 according to Sample 1 and Sample 2 in Table 1, when width w1 of the first nick portion is reduced, cross-sectional area A1 of first nick portion 13 decreases, by which the chip discharge performance deteriorates. When first nick portion 13 is clogged by the chips, the cutting resistance of cutting tool 1 increases, and as a result, the tool life of cutting tool 1 is reduced.

From the test results of cutting tool 1 according to Samples 1 and 3, the finish of the cut surface is improved by additionally providing second nick portion 14 in addition to first nick portion 13 in main cutting edge portion 11. This is considered to be because the vibration generated during cutting is reduced, resulting in improvement of finish of the cut surface. Since the area for discharging chips is increased by providing second nick portion 14, the chip discharge performance is improved. It is considered that, as a result, the tool life remains satisfactory without being reduced by providing second nick portion 14.

(Test 2)

<Object for Test>

Test 2 was carried out to evaluate the finish of the cut surface of a workpiece, chip discharge performance, and the tool life of cutting tool 1 due to the shape of second nick portion 14. Ten kinds of cutting tools 1 from Sample 4 to Sample 13 were used as objects for the test. In cutting tool 1 according to Sample 4, main cutting edge portion 11 has first nick portion 13, but does not have second nick portion 14. On the other hand, in cutting tool 1 according to each of Samples 5 to 13, main cutting edge portion 11 includes first nick portion 13 and second nick portion 14. In particular, in cutting tools 1 according to Samples 5 to 13, the influence caused mainly by changing the width ratio (w1/w2), the depth ratio (h1/h2), and the cross-sectional area ratio (A1/A2) was examined. The width ratio is a value obtained by dividing width w1 of first nick portion 13 by width w2 of second nick portion 14. The depth ratio is a value obtained by dividing depth h1 of first nick portion 13 by depth h2 of second nick portion 14. The cross-sectional area ratio is a value obtained by dividing cross-sectional area A1 of first nick portion 13 by cross-sectional area A2 of second nick portion 14.

The cutting diameter of cutting tool 1 according to each of Samples 4 to 10 and Sample 13 is 10 mm. The cutting diameter of cutting tool 1 according to each of Samples 11 and 12 is 3 mm. In cutting tool 1 according to each of Samples 4 to 6, main helix angle θ1 of main cutting edge 11a is 45°. On the other hand, in cutting tools 1 according to Samples 7 to 10, main helix angles θ1 of main cutting edges 11a are within a range from 20° to 50°, and are different from each other. Cutting tool 1 according to each of Samples 4 to 12 is coated with diamond. On the other hand, cutting tool 1 according to Samples 13 is not coated with diamond. In addition, in cutting tools 1 according to Samples 4 to 10 and cutting tool 1 according to Sample 13 having a cutting diameter of 10 mm, the number of main cutting edge portions 11 is five, and the number of first nick portions 13 and the number of second nick portions 14 in one main cutting edge portion 11 are each six. On the other hand, in cutting tools 1 according to Samples 11 and 12 having a cutting diameter of 3 mm, the number of main cutting edge portions 11 is three, and the number of first nick portions 13 and the number of second nick portions 14 in one main cutting edge portion 11 are each four.

<Test Conditions>

The workpiece is CFRP. The thickness of the CFRP is 6 mm. As cutting conditions, the rotation speed of cutting tool 1 was set to 8000 rpm, and the machining speed was set to 1600 mm/min <Result>

TABLE 2

|  | Condition | | | | | Result | | |
| --- | --- | --- | --- | --- | --- | --- | --- | --- |
|  | Width ratio w1/w2 | Depth ratio h1/h2 | Cross-sectional area ratio A1/A2 | Main helix angle θ1 | Diamond coating | Finish of cut surface | Chip discharge performance | Tool life |
| Sample 4 | — | — | — | 45° | Provided | D | D | B |
| Sample 5 | 2 | 1 | 1.5 | 45° | Provided | B | C | B |
| Sample 6 | 4 | 5 | 18 | 45° | Provided | A | A | A |
| Sample 7 | 11 | 16 | 125 | 25° | Provided | B | A | C |
| Sample 8 | 10 | 5 | 49 | 30° | Provided | A | A | A |
| Sample 9 | 11 | 7 | 42 | 40° | Provided | B | A | B |
| Sample 10 | 5 | 17 | 74 | 50° | Provided | A | A | B |

TABLE 2-continued

|  | Condition | | | | | Result | | |
| --- | --- | --- | --- | --- | --- | --- | --- | --- |
|  | Width ratio w1/w2 | Depth ratio h1/h2 | Cross-sectional area ratio A1/A2 | Main belix angle θ1 | Diamond coating | Finish of cut surface | Chip discharge performance | Tool life |
| Sample 11 | 2 | 2 | 12 | 45° | Provided | A | A | A |
| Sample 12 | 1.5 | 4 | 19 | 55° | Provided | B | A | B |
| Sample 13 | 4 | 5 | 18 | 45° | Not provided | A | A | C |

The results are shown in Table 2. Table 2 shows, from the left, the width ratio, the depth ratio, the cross-sectional area ratio, main helix angle θ1, and whether or not diamond coating is provided as the conditions, and the finish of the cut surface of the workpiece, the chip discharge performance, and the tool life of cutting tool 1 as the test results. Note that A, B, C, and D indicate the evaluation in each of the finish of the cut surface, the chip discharge performance, and the tool life of cutting tool 1 in Table 2. C indicates that the result is better than the result indicated as D. B indicates that the result is better than the result indicated as C. A indicates that the result is better than the result indicated as B. That is, A indicates that the evaluation result is the best of the results indicated by A, B, C, and D.

As can be seen from Table 2, the finish of the cut surface by cutting tools 1 according to Samples 5 to 13 is improved as compared with the finish of the cut surface by cutting tool 1 according to Sample 4. The chip discharge performance of cutting tools 1 according to Samples 5 to 13 is improved as compared with the chip discharge performance of cutting tool 1 according to Sample 4. From the above, the finish of the cut surface and the chip discharge performance are improved by additionally providing second nick portion 14 in addition to first nick portion 13 in main cutting edge portion 11. In this respect, it can be said that Test 2 has the same result as Test 1. In particular, it has been found from the test results of cutting tools 1 according to Samples 5 and 6 that, when the width ratio and the depth ratio increase, the cross-sectional area ratio increases, by which not only the finish of the cut surface but also the chip discharge performance are significantly improved.

The width ratio of cutting tool 1 according to each of Samples 7 and 9 is 11. Therefore, the length of main cutting edge 11a becomes insufficient, and thus, the finish of the cut surface deteriorates. In view of this, the width ratio is preferably less than or equal to 10. Although cutting tool 1 according to Sample 8 has a slow helix design in which main helix angle θ1 of the main cutting edge is 30°, the finish of the cut surface and the chip discharge performance are improved.

Cutting tool 1 according to Sample 10 has a depth ratio of 17. As a result, the rigidity of cutting tool 1 is low Therefore, the depth ratio is preferably less than or equal to 16 From the above results, width w1 of first nick portion 13 is preferably greater than or equal to 2 times and less than or equal to 10 times width w2 of second nick portion 14. Depth h1 of first nick portion 13 is preferably greater than or equal to 2 times and less than or equal to 15 times depth h2 of second nick portion 14. From another viewpoint, cross-sectional area A1 of first nick portion 13 is preferably greater than or equal to 5 times and less than or equal to 120 times cross-sectional area A2 of second nick portion 14.

From the test results of cutting tools 1 according to Sample 11 and Sample 12, each of which has a cutting diameter of 3 mm, providing second nick portion 14 in main cutting edge portion 11 improves the finish of the cut surface and the chip discharge performance as in cutting tool 1 having a cutting diameter of 10 mm.

However, providing second nick portion 14 in main cutting edge portion 11 may reduce the tool life of cutting tool 1. From the test results of cutting tools 1 according to Sample 6 and Sample 13, it can be seen that the tool life is significantly improved by coating cutting tool 1 with diamond.

First Modification of First Embodiment

<Configuration of Modification>

Figure 5:
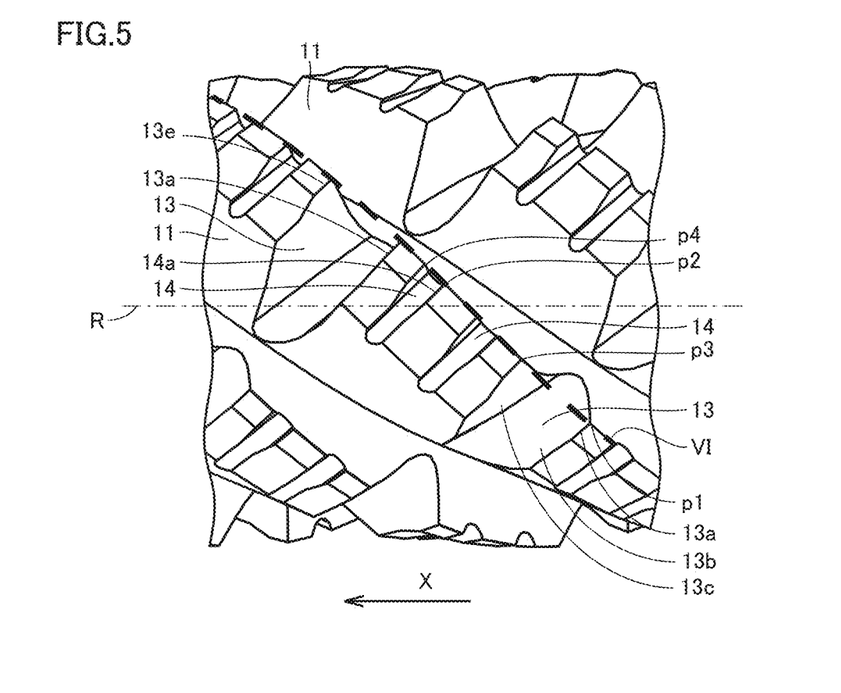
FIG. 5 is a partially enlarged plan view illustrating a first modification of the cutting tool according to the first embodiment.
Figure 6:
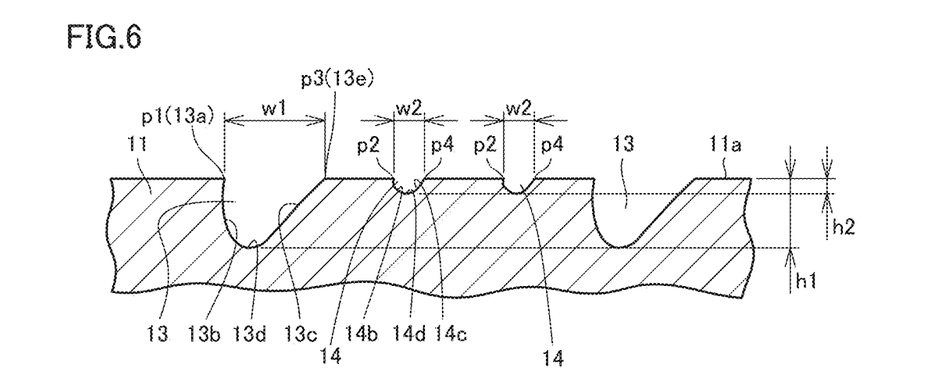
FIG. 6 is a partially enlarged schematic sectional view illustrating a region VI in FIG. 5.

FIG. 5 is a partially enlarged plan view illustrating a first modification of cutting tool 1 according to the first embodiment. FIG. 5 corresponds to FIG. 2. FIG. 6 is a partially enlarged schematic sectional view illustrating region VI in FIG. 5. FIG. 6 corresponds to FIG. 4.

Cutting tool 1 illustrated in FIGS. 5 and 6 basically has the same configuration as cutting tool 1 illustrated in FIGS. 1 to 4, but is different from cutting tool 1 illustrated in FIGS. 1 to 4 in that two second nick portions 14 are formed between two first nick portions 13. Specifically, two second nick portions 14 are disposed in main cutting edge portion 11 so as to be sandwiched between two first nick portions 13 as illustrated in FIG. 6. The number of second nick portions 14 is not limited to two. For example, three second nick portions 14 may be formed in main cutting edge portion 11 so as to be sandwiched between two first nick portions 13. Providing a plurality of second nick portions 14 between two first nick portions 13 as described above can significantly suppress vibration generated during cutting. As a result, the finish quality of the machined surface of the workpiece cut by cutting tool 1 is further improved.

Second Modification of First Embodiment

<Configuration of Modification>

Figure 7:
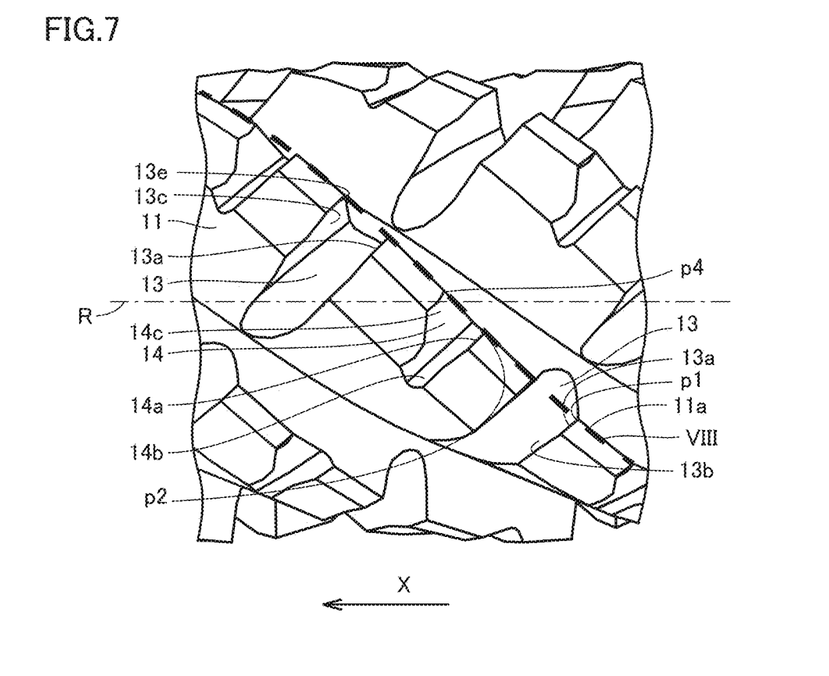
FIG. 7 is a partially enlarged plan view illustrating a second modification of the cutting tool according to the first embodiment.
Figure 8:
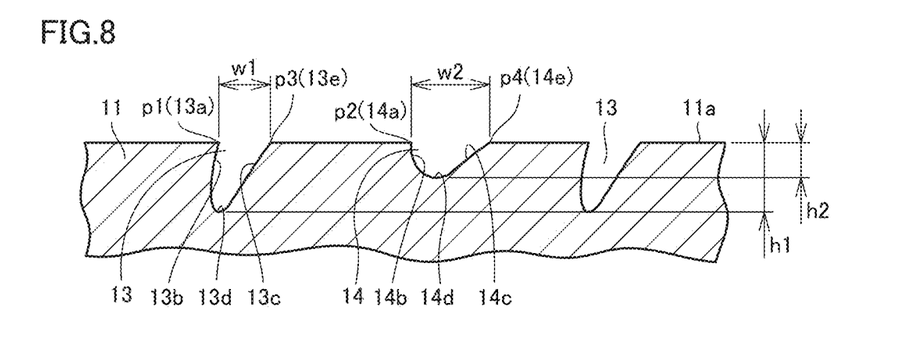
FIG. 8 is a partially enlarged schematic sectional view illustrating a region VIII in FIG. 7.

FIG. 7 is a partially enlarged plan view illustrating a second modification of cutting tool 1 according to the first embodiment. FIG. 7 corresponds to FIG. 2. FIG. 8 is a partially enlarged schematic sectional view illustrating region VIII in FIG. 7. FIG. 8 corresponds to FIG. 4.

Cutting tool 1 illustrated in FIGS. 7 and 8 basically has the same configuration as cutting tool 1 illustrated in FIGS. 1 to 4, but is different from cutting tool 1 illustrated in FIGS. 1 to 4 in that width w2 of second nick portion 14 is larger than width w1 of first nick portion 13. It is only sufficient that depth h1 of first nick portion 13 is larger than depth h2 of second nick portion 14 in order to ensure the chip discharge performance. Alternatively, it is only sufficient that width w1 of first nick portion 13 is larger than width w2 of second nick portion 14. Specifically, the relationship between first nick portion 13 and second nick portion 14 satisfies at least one of a first condition and a second condition from the results of Test 2 described above. The first condition is that width w1 of first nick portion 13 is greater than or equal to 2 times and less than or equal to 10 times width w2 of second nick portion 14. The second condition is that depth h1 of first nick portion 13 is greater than or equal to 2 times and less than or equal to 15 times depth h2 of second nick portion 14.

With this configuration, cutting tool 1 can suppress vibration generated during cutting while ensuring chip discharge performance.

It should be understood that the embodiment disclosed herein is illustrative in all respects and not restrictive. The basic scope of the present invention is defined not by the embodiment but by the claims, and is intended to include meanings equivalent to the claims and all modifications within the scope.

REFERENCE SIGNS LIST 1 cutting tool, 2 outer peripheral surface, 2a front end face, 2b rear end face, 10 cutting portion, 11 main cutting edge portion, 11a main cutting edge, 11b main rake face, 11c main flank face, 13 first nick portion, 13a first nick cutting edge, 13b first nick rake face, 13c first nick facing face, 13d first nick bottom portion, 13e first nick connection portion, 14 second nick portion, 14a second nick cutting edge, 14b second nick rake face, 14c second nick facing face, 14d second nick bottom portion, 14e second nick connection portion, 20 shank portion, 30 shaft portion. A first region, A1, A2 cross-sectional area, B region, C center, R central axis, W blade length, X first direction, h1, h2 depth, w1, w2 width, p1 first intersection point, p2 second intersection point, p3 third intersection point, p4 fourth intersection point

The invention claimed is:

1. A cutting tool comprising:
a shaft portion that extends along a central axis and has an outer peripheral surface surrounding the central axis; and
at least two main cutting edge portions helically disposed on the outer peripheral surface, wherein
the main cutting edge portions have a main cutting edge having a helix angle, and include at least one first nick portion and at least one second nick portion that have helix angles in an opposite direction with respect to the helix angle in a section within ±30% of a blade length of a region where the main cutting edge portions are formed from a center of the region in a direction along the central axis,
a flank portion having a zero flank clearance angle, the flank portion connecting each of the at least one first nick cutting edge to a corresponding one of the at least one second nick connection portion, and
the width of the first nick portion is greater than or equal to 2 times and less than or equal to 10 times the width of the second nick portion.

2. The cutting tool according to claim 1, wherein
a number of the main cutting edge portions is larger than a number of a groove shaped by the first nick portions included in each of the main cutting edge portions, and
the depth of the first nick portion is greater than or equal to 2 times and less than or equal to 15 times the depth of the second nick portion.

3. The cutting tool according to claim 1, wherein
a cross-sectional area of the first nick portion is greater than or equal to 5 times and less than or equal to 120 times a cross-sectional area of the second nick portion, and
a number of the main cutting edge portions is larger than a number of a groove shaped by the first nick portions included in each of the plain cutting edge portions.

4. The cutting tool according to claim 1, wherein
a number of the main cutting edge portions is larger than a number of a groove shaped by the first nick portions included in each of the main cutting edge portions,
the helix angle of the main cutting edge is greater than or equal to 30° and less than or equal to 50°, and
the helix angle in the opposite direction with respect to the helix angle in each of the first nick portion and the second nick portion is greater than or equal to 30° and less than or equal to 50°.

5. The cutting tool according to claim 1, wherein
a cross-sectional area of the first nick portion is greater than or equal to 5 times and less than or equal to 120 times a cross-sectional area of the second nick portion,
a number of the main cutting edge portions is larger than a number of a groove shaped by the first nick portions included in each of the main cutting edge portions,
the helix angle of the main cutting edge is greater than or equal to 30° and less than or equal to 50°, and
the helix angle in the opposite direction with respect to the helix angle in each of the first nick portion and the second nick portion is greater than or equal to 30° and less than or equal to 50°.

6. The cutting tool according to claim 1, wherein
the depth of the first nick portion is greater than or equal to 2 times and less than or equal to 15 times the depth of the second nick portion,
the main cutting edge portions include at least two first nick portions, each of which is the at least one first nick portion, and
the second nick portion is disposed at an intermediate position between two of the first nick portions.

7. The cutting tool according to claim 1, wherein
a cross-sectional area of the first nick portion is greater than or equal to 5 times and less than or equal to 120 times a cross-sectional area of the second nick portion, and
the main cutting edge portions include at least two first nick portions, each of which is the at least one first nick portion, and
the second nick portion is disposed at an intermediate position between two of the first nick portions.

8. The cutting tool according to claim 1, wherein a number of the main cutting edge portions is larger than a number of a groove shaped by the first nick portions included in each of the main cutting edge portions.

9. The cutting tool according to claim 1, wherein
the main cutting edge portions include at least two first nick portions, each of which is the at least one first nick portion, and
the second nick portion is disposed at an intermediate position between two of the first nick portions.

10. A cutting tool comprising:
a shaft portion that extends along a central axis and has an outer peripheral surface surrounding the central axis; and
at least two main cutting edge portions helically disposed on the outer peripheral surface, wherein
the main cutting edge portions have a main cutting edge having a helix angle, and include at least one first nick portion and at least one second nick portion that have helix angles in an opposite direction with respect to the helix angle in a section within ±30% of a blade length of a region where the main cutting edge portions are formed from a center of the region in a direction along the central axis, a flank portion having a zero flank clearance angle, the flank portion connecting each of the at least one first nick cutting edge to a corresponding one of the at least one second nick connection portion, and the depth of the first nick portion is greater than or equal to 2 times and less than or equal to 15 times the depth of the second nick portion.

11. The cutting tool according to claim 10, wherein
a cross-sectional area of the first nick portion is greater than or equal to 5 times and less than or equal to 120 times a cross-sectional area of the second nick portion,
a number of the main cutting edge portions is larger than a number of a groove shaped by the first nick portions included in each of the main cutting edge portions.

12. The cutting tool according to claim 10, wherein
a number of the main cutting edge portions is larger than a number of a groove shaped by the first nick portions included in each of the main cutting edge portions,
the helix angle of the main cutting edge is greater than or equal to 30° and less than or equal to 50°, and
the helix angle in the opposite direction with respect to the helix angle in each of the first nick portion and the second nick portion is greater than or equal to 30° and less than or equal to 50°.

13. The cutting tool according to claim 10, wherein
a cross-sectional area of the first nick portion is greater than or equal to 5 times and less than or equal to 120 times a cross-sectional area of the second nick portion,
a number of the main cutting edge portions is larger than a number of the first nick portions included in each of the main cutting edge portions,
the helix angle of the main cutting edge is greater than or equal to 30° and less than or equal to 50°, and
the helix angle in the opposite direction with respect to the helix angle in each of the first nick portion and the second nick portion is greater than or equal to 30° and less than or equal to 50°.

14. The cutting tool according to claim 10, wherein
a cross-sectional area of the first nick portion is greater than or equal to 5 times and less than or equal to 120 times a cross-sectional area of the second nick portion,
the main cutting edge portions include at least two first nick portions, each of which is the at least one first nick portion, and
the second nick portion is disposed at an intermediate position between two of the first nick portions.

15. The cutting tool according to claim 10, wherein a number of the main cutting edge portions is larger than a number of a groove shaped by the first nick portions included in each of the main cutting edge portions.

16. The cutting tool according to claim 10, wherein
the main cutting edge portions include at least two first nick portions, each of which is the at least one first nick portion, and
the second nick portion is disposed at an intermediate position between two of the first nick portions.

17. A cutting tool comprising:
a shaft portion that extends along a central axis and has an outer peripheral surface surrounding the central axis; and
at least two main cutting edge portions helically disposed on the outer peripheral surface, wherein
the main cutting edge portions have a main cutting edge having a helix angle, and include at least one first nick portion and at least one second nick portion that have helix angles in an opposite direction with respect to the helix angle in a section within ±30% of a blade length of a region where the main cutting edge portions are formed, from a center of the region in a direction along the central axis,
a flank portion having a zero flank clearance angle, the flank portion connecting each of the at least one first nick cutting edge to a corresponding one of the at least one second nick connection portion, and
a cross-sectional area of the first nick portion is greater than or equal to 5 times and less than or equal to 120 times a cross-sectional area of the second nick portion.

18. The cutting tool according to claim 17, wherein
a number of the main cutting edge portions is larger than a number of a groove shaped by the first nick portions included in each of the main cutting edge portions,
the helix angle of the main cutting edge is greater than or equal to 30° and less than or equal to 50°, and
the helix angle in the opposite direction with respect to the helix angle in each of the first nick portion and the second nick portion is greater than or equal to 30° and less than or equal to 50°.

19. The cutting tool according to claim 17, wherein a number of the main cutting edge portions is larger than a number of a groove shaped by the first nick portions included in each of the main cutting edge portions.

20. The cutting tool according to claim 17, wherein
the main cutting edge portions include at least two first nick portions, each of which is the at least one first nick portion, and
the second nick portion is disposed at an intermediate position between two of the first nick portions.

* * * * *